United States Patent Office 2,898,231
Patented Aug. 4, 1959

2,898,231

METHOD OF REMOVING RESIDUAL PEROXIDE CATALYST FROM RESIN COATINGS

Howard C. Haas, Arlington, Mass., assignor to Polaroid Corporation, Cambridge, Mass., a corporation of Delaware No Drawing. Application November 18, 1957
Serial No. 696,899

18 Claims. (Cl. 117—62)

This invention relates to high polymers and more particularly to novel processes for treating plastic coatings, films and laminates.

One object of this invention is to provide novel processes for deactivating residual peroxide catalysts in plastic coatings, films and laminates.

Another object of this invention is to provide processes wherein this deactivation may be carried out at low temperatures and without causing excessive swelling or distortion of the materials.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

It is often necessary and desirable to deactivate residual peroxide catalysts in plastic coatings, films and laminates in order to prevent harmful side reactions. Such catalysts may, for example, cause undesirable dye discoloration due to the oxidation of dyes which may be incorporated in the coatings or films themselves or in other layers of a laminate. When polymerization is effected prior to application and processed in solvents or in a thermoplastic state, no serious difficulties arise because the residual peroxide catalyst may be readily deactivated prior to application by methods known to the art such as, for example, decomposition with organic primary and secondary amines, baking at high temperatures, solvent extraction, etc. However, when polymerization is effected in situ, the before mentioned deactivating methods often do not lend themselves to the task because of excessive swelling, undesirable decomposition products, distortion, crazing, etc.

The present invention provides processes wherein residual peroxide catalysts present in polymeric coatings, films and laminates may be effectively decomposed without substantially altering, distorting, etc. the polymer. The processes comprise exposing said coatings, films and laminates to the hydrogen iodide vapors of an aqueous hydrogen iodide solution and, after exposure, driving off, at a relatively low temperature, the iodine which is produced as a result of the decomposition.

The processes herein disclosed are especially useful on thermosetting crosslinked polymeric surface coatings, which today are widely used as mar-resistant finishes for plastic sheets and laminates. Such polymers, because of their inherent insolubility and lack of thermoplasticity, must be polymerized subsequent to application and, thus, generally contain residual peroxides which may, as previously noted, have harmful effects on the finished product.

The processes of this invention are particularly useful in decomposing the residual peroxide catalysts in the mar-resistant surface coatings of the plastic optical elements disclosed in the copending application of Elkan R. Blout, H. O. Buzzell and Leonard Farney, Serial No. 539,219, filed October 7, 1955. Generally, the optical elements therein disclosed comprise laminated sheets of thermoplastic polymers coated on both surfaces with a crosslinked polymer of a diethylenic-substituted polyethyleneglycol monomer such, for example, as tetraethyleneglycol dimethacrylate. In one of the specific embodiments disclosed therein, the optical element comprises a laminate of a central layer of light-polarizing material such, for example, as molecularly oriented polyvinyl alcohol which has been dyed or stained with a dichroic dye, usually a dye comprising iodine and an iodide. This centrally disposed layer or film of polarizing material is bonded on each of its surfaces to a sheet of a cellulosic compound such, for example, as cellulose acetate butyrate or cellulose acetate. The cellulosic layers in turn are coated with the mar-resistant surface coatings. The surface coating is preferably applied by coating the cellulosic surfaces with a thin layer of a diethylenic-substituted polyethyleneglycol monomer containing a peroxide catalyst such, for example, as diisopropyldipercarbonate, and polymerizing it in contact with a heated, optically smooth surface. In certain instances such, for example, as when the optical elements are to be used as sunglasses, the cellulosic layers may contain a dye or dyes. It has been found that if the residual peroxide catalyst is not deactivated, it will migrate into the cellulosic layers during aging and oxidize the dyes contained therein and result in discoloration. The processes disclosed herein provide means whereby deactivation may be carried out without altering or distorting the optical elements.

In carrying out the processes herein disclosed, the coatings, films or laminates to be deactivated are preferably disposed in a closed chamber containing the hydrogen iodide vapors of an aqueous hydrogen iodide solution. In a preferred mode of carrying out this invention, the source of hydrogen iodide vapors is about a 47% aqueous solution. However, higher or lower concentrations may be used. The processes may be carried out at room temperature and preferably are carried out at a slightly elevated temperature such, for example, as 45° C., but it is contemplated that higher temperatures may be used. The time of exposure will vary depending upon factors such as amount of residual catalyst present, permeability of the polymer to the hydriodic acid, thickness of the coating, temperature, concentration of the hydriodic acid, etc. In most cases, exposure for two hours at 45° C. will substantially destroy any residual peroxide catalyst. The iodine which is produced as a result of the decomposition may cause the polymers to turn slightly brown. However, baking at about 70° C. for about two hours will usually be sufficient to drive off the residual iodine and restore the polymer to its original color.

The following nonlimiting example illustrates a process within the scope of this invention:

*Example 1*

A laminate, comprising a center layer of a molecularly orientated polyvinyl alcohol sandwiched between two sheets of cellulose acetate butyrate, is coated on both surfaces with a solution comprising:

| | Grams |
|---|---|
| Tetraethyleneglycol dimethacrylate | 90 |
| Cellulose nitrate (thickener) | 10 |
| Diisopropyldipercarbonate | 0.75 | and heated in an air-free atmosphere between two optically smooth platens for about three minutes at 80 to 100° C. to form a layer approximately 0.001 inch thick.

The above laminated sheet is placed in an oven containing a beaker of 47% aqueous hydrogen iodide for about two hours at 45° C. At the end of the two hour period, the sheet is baked at 70° C. for about another two hours to remove the residual iodine. An examination of the sheet shows no visual severance of the bonding or excessive distortion or swelling. Upon testing for residual diisopropyldipercarbonate with a solution comprising 2% benzidine in 20% aqueous acetic acid, the results were negative. An abrasion test indicated that the treatment had no effect on the mar-resistance of the coating.

It should be noted that the processes herein disclosed are not limited to deactivating dipercarbonate catalysts but, are effective on peroxide catalysts in general. As examples of additional peroxide catalysts which may be deactivated, mention may be made of peroxides of aromatic acids, such as benzoyl peroxide and substituted benzoyl peroxides; peroxides of aliphatic acids such as lauroyl peroxide; ketone peroxides such as methyl amyl ketone peroxide; aldehyde peroxides; dialkyl peroxides such as di-t-butyl peroxide; hydroperoxides such as t-butyl hydroperoxide and peroxide esters such as t-butyl-perbenzoate.

As examples of other polymers which may be treated by the processes herein disclosed, mention may be made of dimethacrylates, polyalkylmethacrylates such as methylmethacrylate and ethylmethacrylate, polyacrylates, polyacrylic and polymethacrylic acid polymers, polyhydrocarbons such as polystyrene, poly alkyl vinyl ketones such as methyl vinyl ketone and thermosetting polyesters.

When the processes of this invention are used on halogen-substituted polymers such, for example, as vinyl chloride and vinylidene chlorides, the hydrogen iodide vapors may accelerate the evolution of hydrogen chloride and suitable precautions such, for example, as low temperatures and dilute solutions of the hydrogen iodide should be employed in order to keep the hydrogen chloride evolution at a minimum.

Since certain changes may be made in the above process without departing from the scope of the invention herein involved, it is intended that all matter contained in the above description shall be interpreted as illustrative and not in a limiting sense.

What is claimed is:

1. A process for decomposing residual peroxide catalysts in plastic coatings, films and laminates, said process comprising exposing the polymer to the hydrogen iodide vapor of an aqueous solution of hydrogen iodide.

2. A process as defined in claim 1 including the step of subsequently baking said polymer to drive off iodine which is produced as a result of the decomposition.

3. A process as defined in claim 1 wherein said hydrogen iodide vapor is supplied from about a 47% aqueous solution.

4. A process as defined in claim 1 wherein said exposure is carried out at about 45° C.

5. A process as defined in claim 2 wherein said baking is carried out at about 70° C.

6. A process as defined in claim 1 wherein said polymer is a crosslinked polymer.

7. A process for decomposing residual peroxide catalysts in a diethylenic-substituted polyethyleneglycol polymeric surface coating, said process comprising exposing said coating to the hydrogen iodide vapor of an aqueous solution of hydrogen iodide.

8. A process as defined in claim 7 including the step of subsequently baking said coating to drive off iodine produced as a result of the decomposition.

9. A process as defined in claim 7 wherein said hydrogen iodide vapor is supplied from about a 47% aqueous solution.

10. A process as defined in claim 7 wherein said exposure is carried out at 45° C.

11. A process as defined in claim 7 wherein said coating is a polymer of tetraethyleneglycol dimethacrylate.

12. A process for decomposing residual peroxide catalysts in crosslinked polymeric surface coatings on plastic, light-polarizing optical elements, said process comprising exposing said element to the hydrogen iodide vapors of an aqueous hydrogen iodide solution.

13. A process as defined in claim 12 including the step of subsequently baking said element to drive off the iodine which is produced as a result of the decomposition.

14. A process as defined in claim 12 wherein said hydrogen iodide vapor is supplied from about a 47% aqueous solution.

15. A process as defined in claim 12 wherein said exposure is carried out at about 45° C.

16. A process as defined in claim 13 wherein said baking is carried out at about 70° C.

17. A process as defined in claim 12 wherein said crosslinked polymeric surface coating is a polymer of a diethylenic-substituted polyethyleneglycol.

18. A process as defined in claim 12 wherein said crosslinked polymeric surface coating is a polymer of tetraethyleneglycol dimethacrylate.

References Cited in the file of this patent

UNITED STATES PATENTS

| | | |
|---|---|---|
| 2,104,760 | Renfrew | Jan. 11, 1938 |
| 2,143,941 | Crawford | Jan. 17, 1939 |
| 2,450,503 | Drummond | Oct. 5, 1948 |
| 2,628,178 | Burnett | Feb. 10, 1953 |